US012675513B1

(12) United States Patent　　　(10) Patent No.:　US 12,675,513 B1

Woodard　　　(45) Date of Patent:　Jul. 7, 2026

(54) SYMBOLIC CONTAINMENT FIREWALL FOR AUDITED LANGUAGE

(71) Applicant: Obligra Group LLC, Tampa, FL (US)

(72) Inventor: Stephen Woodard, Tampa, FL (US)

(73) Assignee: Obligra Group LLC, Tampa, FL (US)

( * ) Notice: Subject to any disclaimer, the term of this patent is extended or adjusted under 35 U.S.C. 154(b) by 0 days.

(21) Appl. No.: 19/416,176

(22) Filed: Dec. 11, 2025

Related U.S. Application Data

(60) Provisional application No. 63/866,676, filed on Aug. 19, 2025.

(51) Int. Cl.
　　*G06F 16/3329*　　(2025.01)
　　*G06F 21/60*　　(2013.01)
　　*G06N 20/00*　　(2019.01)

(52) U.S. Cl.
　　CPC ...... *G06F 16/33295* (2025.01); *G06F 21/602* (2013.01); *G06N 20/00* (2019.01)

(58) Field of Classification Search
　　CPC .. G06F 16/33295; G06F 21/602; G06N 20/00
　　See application file for complete search history.

(56) References Cited

U.S. PATENT DOCUMENTS 8,422,682　B2　　4/2013　Ortiz Cornet et al.
2024/0289561　A1 *　8/2024　Qadrud-Din .......... G06F 40/289

2025/0005060　A1　　1/2025　Phiri et al.
2025/0086309　A1　　3/2025　Harinath et al.
2025/0322046　A1 *　10/2025　Jain .................... G06F 21/6218

* cited by examiner

*Primary Examiner* — Pierre Louis Desir

*Assistant Examiner* — Daniel W Chung

(74) *Attorney, Agent, or Firm* — Anton J. Hopen; Trenam Law

(57)　　　　　　ABSTRACT

This disclosure relates to a symbolic containment firewall that evaluates and governs natural language transactions before they modify state in downstream computer systems. Incoming text is associated with a configurable domain profile and normalized, and heuristic features such as entropy, anchor coverage, omissions, and contradictions are computed. A model adapter obtains a model assisted structural stability score, and a symbolic containment engine combines the heuristic features and model score into a containment stability score and containment stability label. A decision stage selects a pass, block, or escalate action and may generate refactored text that satisfies domain profile requirements. For each transaction, the system constructs a canonical audit object that captures the input, context, analysis, and decision, computes a cryptographic seal over a deterministic representation of the audit object, and writes the sealed audit object to write once read many storage that gates downstream execution and enables later verification of containment decisions.

20 Claims, 8 Drawing Sheets

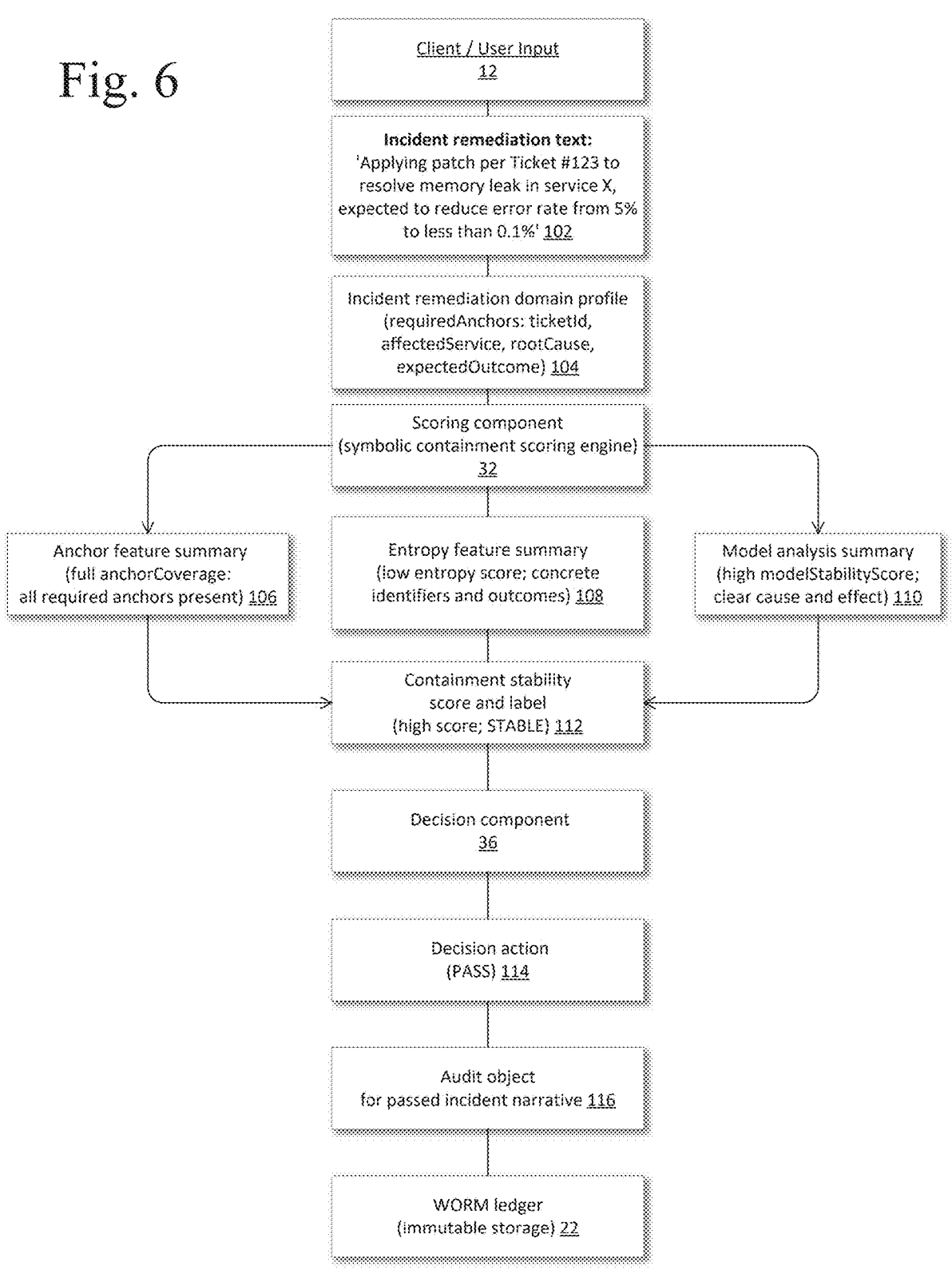

Client / User Input
12

Incident remediation text:
'Applying patch per Ticket #123 to
resolve memory leak in service X,
expected to reduce error rate from 5%
to less than 0.1%' 102

Incident remediation domain profile
(requiredAnchors: ticketId,
affectedService, rootCause,
expectedOutcome) 104

Scoring component
(symbolic containment scoring engine)
32

Anchor feature summary
(full anchorCoverage:
all required anchors present) 106

Entropy feature summary
(low entropy score; concrete
identifiers and outcomes) 108

Model analysis summary
(high modelStabilityScore;
clear cause and effect) 110

Containment stability
score and label
(high score; STABLE) 112

Decision component
36

Decision action
(PASS) 114

Audit object
for passed incident narrative 116

WORM ledger
(immutable storage) 22

SYMBOLIC CONTAINMENT FIREWALL FOR AUDITED LANGUAGE

PRIORITY INFORMATION

This nonprovisional application claims priority to U.S. Provisional Application No. 63/866,676 filed Nov. 3, 2025.

FIELD OF THE DISCLOSURE

Aspects of the present disclosure generally relate to governance of natural language interactions in computing systems, including symbolic containment analysis, risk scoring, and immutable audit logging of text based events.

BACKGROUND OF THE INVENTION

This invention relates, generally, to computer implemented governance of natural language communications. More specifically, it relates to a symbolic containment scoring engine and canonical containment protocol that enforce structural stability and tamper evident audit logging for language based transactions in high risk domains.

BRIEF DESCRIPTION OF THE PRIOR ART

Existing language driven systems suffer from two persistent failure modes. In a first failure mode, probabilistic hallucination, large language models generate fluent text based on next token probabilities rather than verified facts or stable structure. Outputs may be logically inconsistent, structurally incomplete, or unsupported by any underlying record. Conventional moderation tools, such as sentiment or toxicity filters, operate in a single pass and primarily target overtly harmful content rather than structural stability. In a second failure mode, human operators in high stakes domains, such as finance, operations, and compliance, can intentionally or unintentionally use ambiguity, omission, or circular reasoning to obscure responsibility and intent. Traditional controls, including passive logs, approval checkboxes, and simple data loss prevention rules, record what was said but do not measure whether the narrative meets domain specific structural requirements or whether key anchors are missing.

Accordingly, what is needed is a model agnostic governance layer that evaluates natural language text for symbolic containment before it can affect downstream state, assigns a numeric containment score and categorical label, and records every decision in an immutable audit object. Such a system should combine deterministic heuristics and model assisted structural analysis, operate as a stateless interceptor between authoring interfaces and execution systems, and ensure that only text that satisfies domain profile requirements is allowed to modify critical systems.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the problems or deficiencies discussed herein.

BRIEF SUMMARY OF THE INVENTION

In certain implementations, an ingress interface executed by one or more processors receives a request that includes natural language input text, optional structured context, and a domain profile identifier. The processors load a domain profile associated with the identifier, where the domain profile specifies required anchors, ambiguity terms, weighting parameters, and threshold values such as a minimum pass score and a block score, together with mappings from score ranges to containment stability labels. The input text is normalized into normalized text, bound to the structured context, and scanned to extract candidate anchors that correspond to the required anchors defined in the domain profile.

The processors compute deterministic heuristic features that include an entropy score derived from occurrences of the ambiguity terms in a tokenized representation of the normalized text, weighted by proximity of those terms to action verbs, and an anchor coverage value computed as a ratio between a count of required anchors present in both the normalized text and the structured context and a total number of required anchors. Additional flags indicate omissions, self contradictions, and fatal conditions. A model adapter formats a provider neutral analysis request that contains the normalized text and domain cues, selects a language model provider according to a routing policy, maps the analysis request to a provider specific request, and returns a normalized response containing a model stability score, inconsistency findings, and an explanatory summary.

A symbolic containment scoring engine aggregates the heuristic features and the model stability score using the weighting parameters in the domain profile to produce a containment stability score and a containment stability label for the request. A decision engine compares the containment stability score with the minimum pass score and the block score and uses the flags to select a decision action of pass, block, or escalate. The decision engine may generate a stabilized refactored text that satisfies required anchors and field level requirements in the domain profile. The processors build a rationale object that summarizes primary factors driving the containment stability label and secondary contributions from entropy, anchor coverage, and the model stability score. The processors can also build a reflection object that describes potential misinterpretations or missing risk factors, and these objects are associated with the refactored text when present.

An audit object builder assembles a canonical audit object that includes the domain profile identifier, normalized text, structured context or a reference to the context, heuristic features, model stability score, containment stability score, containment stability label, decision action, rationale object, reflection object, refactored text, any warning, and an identifier of the actor associated with the request. The audit object is canonicalized into a deterministic byte representation by sorting keys, normalizing formatting, and encoding in a defined way. A cryptographic seal, such as a hash produced by a cryptographic hash function, is computed over the deterministic byte representation and embedded into the audit object. The sealed audit object is written into a write once read many ledger implemented as a data store that uses unique record identifiers and conditional write policies to prevent modification of existing records and to restrict deletion operations, thereby providing logical write once, read many behavior.

In some embodiments, a verification interface or verification service retrieves stored audit objects from the write once read many ledger, canonicalizes each audit object a second time to produce a second deterministic byte representation, recomputes a second cryptographic seal over that representation, and reports whether the recomputed seal matches the cryptographic seal embedded in the audit object, thereby enabling verification of integrity for symbolic containment decisions. In a representative system embodiment, an ingress interface, symbolic containment scoring engine, decision engine, model adapter, audit object builder, write once read many ledger, verification service, and downstream execution controller are implemented in a stateless orchestration kernel that processes each request as an independent transaction object without retaining conversational memory across requests. The downstream execution controller delays modification of a downstream execution system until after the audit object is written to the write once read many ledger and the decision action is pass. Additional embodiments provide non transitory computer readable media storing instructions that, when executed, cause processors to perform the described operations.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The appended drawings are provided to facilitate a more detailed understanding of the features of the present disclosure and to support the following specific description. The disclosure is described below with reference to certain aspects, some of which are illustrated in the appended drawings. It should be understood that the appended drawings depict only illustrative examples of the disclosure and are therefore not to be considered as limiting its scope, as the description may encompass other equally effective implementations. In some instances, the same reference numbers in different drawings may be used to identify the same or similar elements for ease of understanding.

FIG. 2 is a sequence diagram depicting an example end-to-end symbolic containment workflow showing request submission, normalization, profile loading, scoring, model interaction, reflection and refactoring loops, decision selection, audit object construction, ledger write, and response generation.

FIG. 6 is a diagram illustrating an example application of the symbolic containment firewall to an incident remediation narrative, showing how a structurally complete narrative is analyzed, scored, approved, and recorded in a canonical audit object.

DETAILED DESCRIPTION OF THE INVENTION

The embodiments described in this application relate to computer implemented systems and methods for enforcing symbolic containment of natural language transactions and for recording the results of that enforcement in a verifiable, immutable audit ledger. The invention introduces a canonical containment protocol that operates as a semantic firewall between natural language authors and downstream execution systems. The protocol defines how input text is bound to a domain profile, normalized, evaluated by a symbolic containment scoring engine, optionally refactored, and finally recorded in a canonical audit object that is cryptographically sealed and written to a write once read many ledger. Only requests that satisfy domain specific containment thresholds are permitted to modify state in downstream systems.

In contrast with conventional logging or simple content moderation, the invention treats symbolic containment as a first class computational object. A transaction is not considered complete until it has been analyzed by the symbolic containment scoring engine, a decision action such as PASS, BLOCK, or ESCALATE has been selected, and a sealed audit object representing that analysis has been committed to an immutable ledger. This sequence is mandatory and occurs before any state change in the target system. The protocol modifies how computer systems accept, analyze, and commit natural language commands in high stakes environments such as financial systems, incident response consoles, and governance communications so that unstable or incomplete commands are prevented from altering persistent state.

Figure 1:
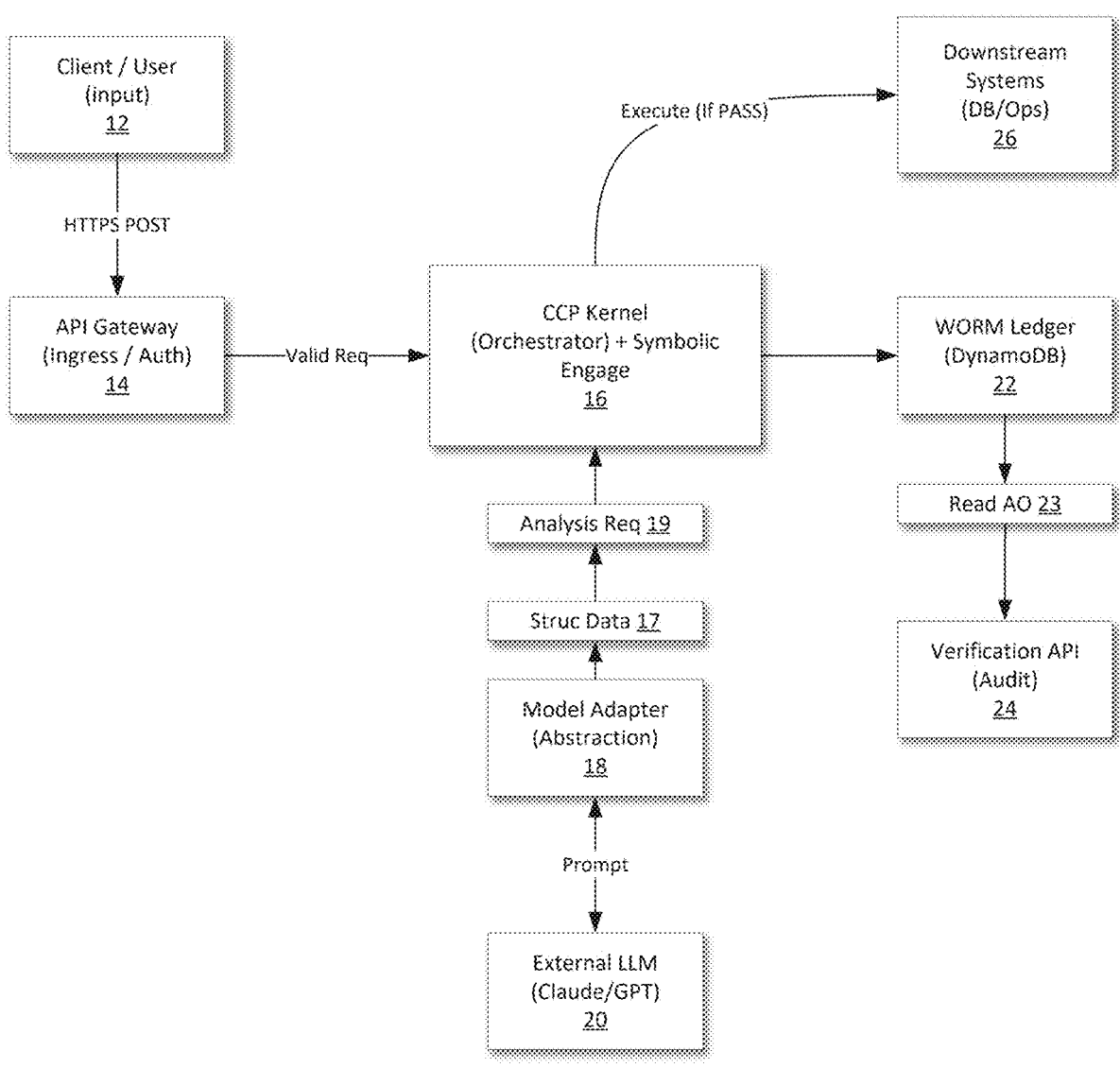
FIG. 1 is a system-level block diagram illustrating an example architecture in which a containment request is submitted through an ingress layer, processed by a canonical containment protocol kernel, evaluated with support from a model adapter and external model, written to an immutable ledger, and conditionally executed by downstream systems.

FIG. 1 illustrates one representative system architecture. A client or user, which may be a human operator, an automated upstream service, or a generative model, interacts with the system through client or user input 12. Requests are submitted using an authenticated network interface such as Hypertext Transfer Protocol Secure. The request is first received by an API gateway 14 providing ingress and authentication. The API gateway 14 validates credentials, enforces rate policies, confirms schema conformance, and converts network level input into a normalized internal request structure. Once validation succeeds, the API gateway 14 forwards a valid request to a canonical containment protocol kernel 16.

The CCP kernel 16 is the orchestrator and symbolic containment engine. It receives the input text, any supplied structured context, a domain profile identifier, and an actor identity associated with the client. The kernel 16 constructs a transaction object in memory that contains these fields along with timestamps and internal analysis fields that will be populated by subsequent stages. The kernel 16 then coordinates the symbolic containment pipeline, invoking a normalization stage, heuristic feature extraction, model assisted analysis, rationale generation, reflection and refactoring, decision selection, and audit object construction.

In order to obtain model assisted structural analysis, the kernel 16 communicates with a model adapter 18 using an analysis request 19. The model adapter 18 transforms the analysis request into a format compatible with one or more external models, such as an external LLM 20. The adapter 18 sends prompts or structured requests to the external model 20 and receives responses that may include suggested stability scores, lists of inconsistencies, natural language explanations, and candidate refactored text. The adapter 18 then normalizes the model output into structured data 17 conforming to an internal schema that the kernel 16 can process consistently across different providers.

Once the symbolic containment pipeline has completed, the CCP kernel 16 constructs an audit object, canonicalizes it into a deterministic representation, computes a cryptographic seal, and writes the sealed audit object to a WORM ledger 22. The WORM ledger 22 may be implemented as a database table with conditional writes, an append only log, or another persistence mechanism that effectively prevents modification of existing records. Audit objects may later be retrieved using a read audit object operation 23 issued by a verification API 24. The verification API 24 recomputes the cryptographic seal and confirms that the audit object has not been altered since it was originally written.

If the decision action determined by the pipeline is PASS, the CCP kernel 16 forwards an execution request to downstream systems 26. The downstream systems 26 may include databases, administrative consoles, transaction engines, messaging systems, or other programmatic interfaces. In a representative deployment, the kernel 16 acts as a pre commit gate. No command is sent to the downstream systems 26 until the containment pipeline is completed and the audit object has been written to the ledger 22. This ordering is enforced in the orchestration logic and provides a clear technical boundary between proposal of an action in language form and execution of that action in the target system.

The term symbolic containment refers to the process of evaluating natural language text to determine whether its symbols, including words, phrases, and narrative structures, remain within predefined interpretive and risk boundaries for a particular domain. Symbolic containment is not limited to toxicity filters or keyword screening. Instead, it examines whether a narrative includes required anchors, whether causal reasoning is expressed, whether pronoun references are resolved, and whether explanations are circular or evasive. Symbolic containment is expressed numerically through a containment stability score and categorically through a containment stability label.

The term domain profile refers to a configuration object that describes how symbolic containment should behave in a specific domain. A domain profile may include a domain name, required anchors such as case identifiers or policy references, a minimum pass score and a block score, score to label mappings, weight parameters for combining heuristics and model scores, lists of ambiguity terms, forbidden patterns, and escalation policies. By externalizing these parameters, the system allows the same kernel 16 and scoring engine to be reused across domains such as incident ledgers, governance communications, and creative writing environments by simply substituting domain profiles without changing the underlying code.

The term audit object refers to the canonical record that the CCP kernel 16 generates for each evaluated transaction.

Figure 4:
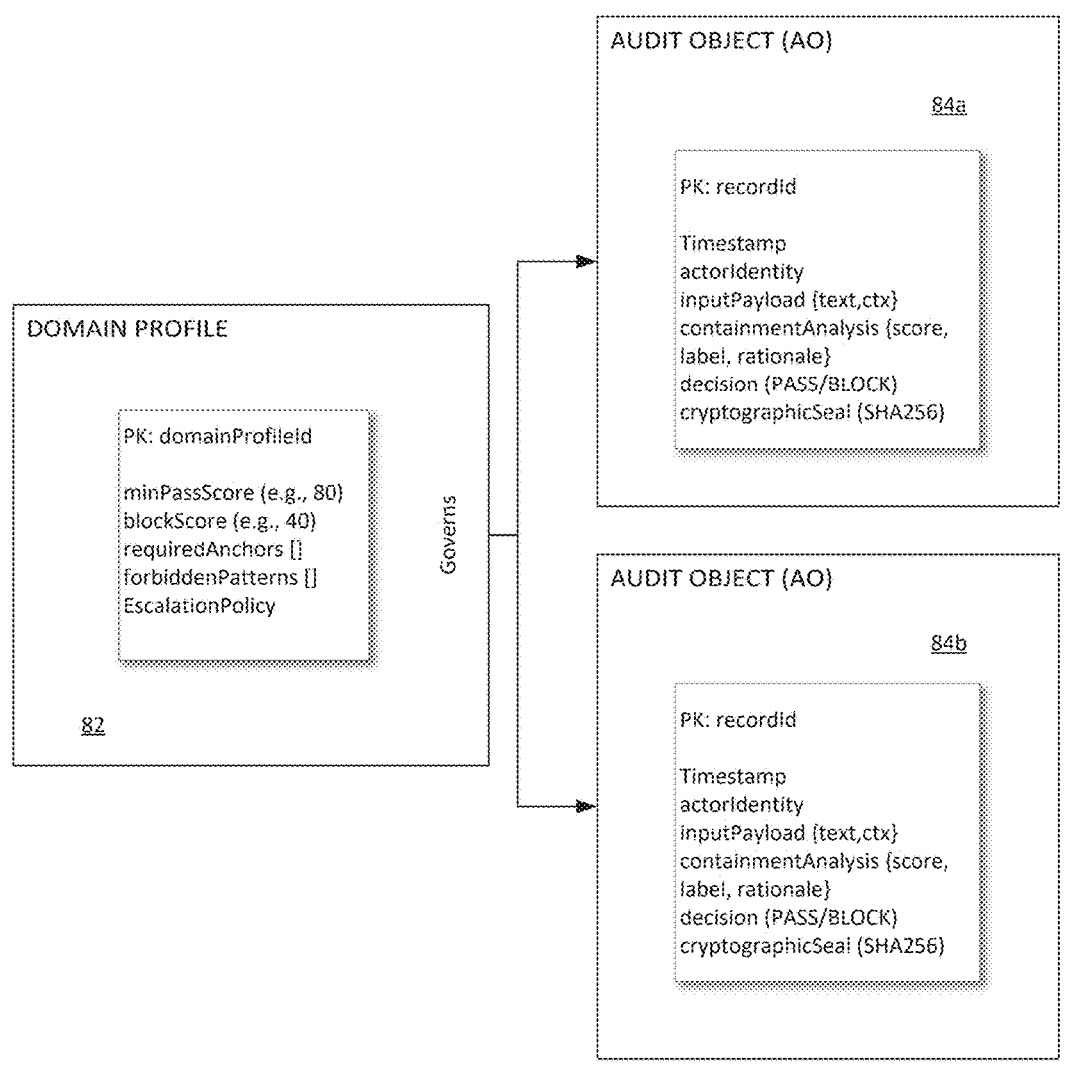
FIG. 4 is a conceptual diagram illustrating how a domain profile governs the construction of standardized audit objects, each containing containment analysis, decision data, and a cryptographic seal stored in an immutable ledger.

Each audit object includes an identifier, timestamp, actor identity, input text and context, containment analysis results including scores and labels, rationale and reflection objects, decision action, warnings, and a cryptographic seal. Audit objects 84*a* and 84*b* in FIG. 4 are examples for two different transactions. The audit object is serialized in a deterministic way, hashed by a cryptographic function to produce the seal, and then written to an immutable ledger for later verification.

The term write once read many ledger refers to a storage system that accepts new records but prevents or strictly controls modification and deletion. A database table configured to accept writes only when a primary key does not already exist, combined with restricted update permissions, yields effective WORM behavior. In other embodiments, a ledger may be implemented using append only logs or cryptographic accumulators. The essential characteristic is that once an audit object is committed to the ledger, later attempts to alter it either fail or are themselves logged in a separately verifiable manner.

In many embodiments, the CCP kernel 16 is implemented as a stateless orchestration service. Each time a containment request arrives from API gateway 14, the kernel 16 constructs a new transaction object with a unique identifier, current timestamp, domain profile identifier, input text, context, and actor identity. The kernel 16 does not retain any conversational history or state from prior transactions. This stateless design greatly simplifies scaling because multiple instances of the kernel 16 can process transactions independently. It also improves security because compromise of a single kernel instance does not reveal historical conversations or contexts beyond the current transaction being processed.

The transaction object may include fields for preliminary flags, such as missing required anchor or presence of potentially unsafe operations, as well as an analysis section that will be populated with heuristic features, model derived metrics, rationale, and reflection. A decision field is initially set to an undecided status. As each stage of the pipeline executes, the kernel 16 updates the transaction object with intermediate results. By the end of the pipeline, the transaction object contains the full symbolic containment record that will be transformed into an audit object.

Figure 2:
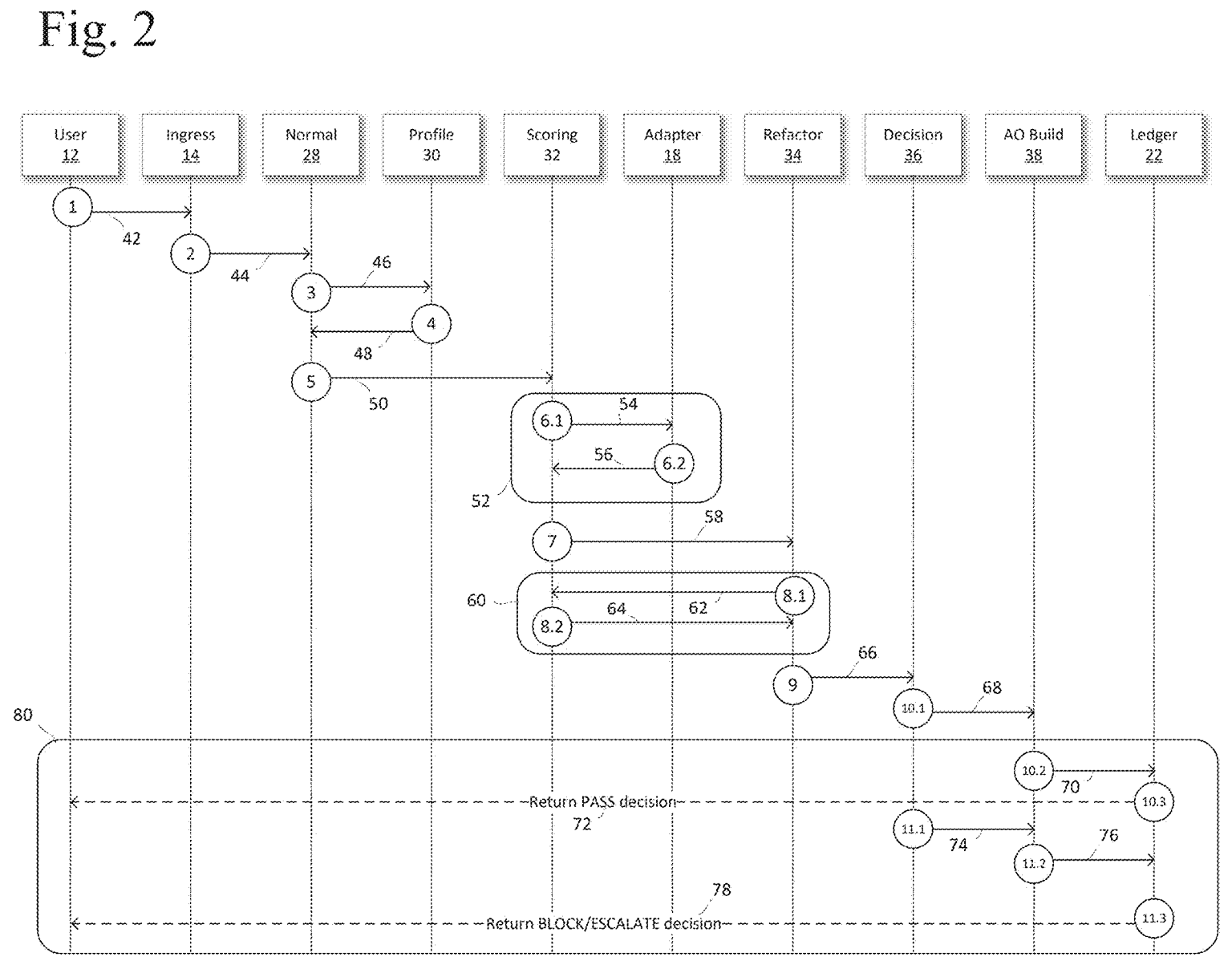

FIG. 2 presents a sequence diagram of an example canonical containment protocol workflow. The user 12 initiates a request represented by step 42, such as submitting an incident remediation description or an administrative command justification. The request is received by ingress 14, which corresponds to the API gateway or equivalent mechanism. The ingress 14 authenticates the user 12, validates that required fields such as domainProfileId and text are present, and forwards the normalized request 44 to a normalization component 28.

The normalization component 28 performs context normalization and anchor extraction. Normalization can include converting text to a canonical encoding, standardizing whitespace, harmonizing line breaks, and unifying alternate spellings of certain tokens according to domain requirements. Anchor extraction attempts to locate domain specific anchors in both text and structured context. For example, in a finance domain, anchors might include a ticket identifier, instrument identifier, and reference to an internal policy. The normalization component 28 passes this information 46 to a profile component 30 that loads domain profile settings based on the supplied domainProfileId. The profile component 30 returns the loaded domain profile 48 to the normalization component 28, which may immediately set preliminary flags in the transaction object if required anchors are obviously missing.

Once basic normalization and domain binding are complete, a scoring component 32 receives the enriched transaction 50 and initiates scoring engage 52. The scoring component 32 extracts heuristic features such as entropy, anchor coverage, indications of contradictions, and omission signals that reflect the absence of required narrative structures. Entropy may be calculated by counting occurrences of high entropy markers, such as ambiguity terms defined in the domain profile, and dividing this count by the total number of tokens, optionally weighted by proximity to verbs that indicate actions or outcomes. Anchor coverage may be computed by determining how many required anchors are present both in structured context and explicitly mentioned in the normalized text, then dividing this count by the number of required anchors in the domain profile.

The scoring component 32 also interacts with the model adapter 18. As indicated by analysis request 54 and model response 56, the scoring component 32 sends the normalized text and domain cues to the model adapter 18. The model adapter 18 chooses an external model 20, constructs a provider specific prompt that instructs the model to perform structural analysis rather than generative rewriting, and sends the prompt to the model 20. The returned response may include a proposed stability score on a normalized scale, a set of textual explanations of inconsistencies, a list of missing elements relative to domain expectations, and an optional improved version of the text. The model adapter 18 maps these outputs into structured data 17 containing a model stability score and structured inconsistency findings and returns them 56 to scoring component 32.

The scoring component 32 then combines the heuristic features and the model stability score using weighting parameters from the domain profile to compute a containment stability score. Penalty terms may be applied if the omission flag or contradiction flag is set. The resulting containment stability score is mapped to a containment stability label according to thresholds in the domain profile. For example, scores above a minimum pass score may map to labels such as STABLE, and scores below a block score may map to labels such as BREACH. Intermediate scores may map to labels such as UNSTABLE or REVIEW.

In one embodiment, the symbolic containment scoring engine aggregates heuristic and model assisted features into a stability score using domain specific weights and penalty terms, as illustrated by the following pseudocode:

```
function computeStabilityScore(features: {
  entropyScore: number;
  anchorCoverage: number;
  modelStabilityScore: number;
  selfContradictionFlag: boolean;
  omissionFlag: boolean;
} , weights: {
  w1: number; w2: number; w3: number; w4: number;
  w5: number;
} ) : number {
  const selfContradictionPenalty =
  features.selfContradictionFlag ? 1 : 0;
  const omissionPenalty = features.omissionFlag ?
  1 : 0;
  return (
  weights.w1 * (1 – features.entropyScore) +
  weights.w2 * features.anchorCoverage +
  weights.w3 * features.modelStabilityScore –
  weights.w4 * selfContradictionPenalty –
  weights.w5 * omissionPenalty
```

-continued

```
  );
}
```

The initial scoring output 58 is supplied to downstream components. In many embodiments, if the label indicates instability or breach, the system then enters a reflection and refactoring stage coordinated by refactor component 34. Communication arrows 64 and 62 in FIG. 2 illustrate that the scoring component 32 and refactor component 34 exchange context and refactored text during this stage. The refactor component 34 uses the model adapter 18 to request a self corrected version of the text that meets domain profile requirements, such as including missing anchors, clarifying the rationale, specifying expected outcomes, or resolving ambiguous pronouns. The refactored text is then passed back to scoring component 32 and may be re-analyzed using the same heuristic and model assisted approach. If the rescore results in improved stability that satisfies domain thresholds, the request may be converted from a potential BLOCK to a PASS, subject to policy.

When scoring has converged, the scoring component 32 forwards final stability results 66 to decision component 36. The decision component 36 compares the containment stability score against the domain profile thresholds and examines flags such as missing required anchor or presence of forbidden patterns. If the score is equal to or above the minimum pass score and no fatal flags are present, the decision component 36 sets the decision action in the transaction object to PASS and triggers an audit object build instruction 68. If the score is below the block score or a fatal flag such as missing required anchor is set, the decision component 36 sets the decision action to BLOCK and triggers a block build instruction 74. Scores in between may result in ESCALATE, in which the request requires human review and is logged but not executed automatically.

The sequence of stages described above can be implemented in software as an orchestration function that initializes a transaction object, invokes each stage, and writes the resulting audit object before returning a response. The following pseudocode illustrates one representative implementation of the canonical containment protocol kernel:

```
async function runContainment(request:
ContainmentRequest) : Promise<ContainmentResult>
{
  const tx = initTransaction(request) ;
  normalizeContext(tx) ;
  computeContainment Features(tx) ;
  await runModelAssessment(tx) ;
  aggregateScores(tx) ;
  generateRationale(tx) ;
  await runReflectionAndRefactor(tx) ;
  decideAndWarn(tx) ;
  const ao = buildAuditObject(tx) ;
  await writeAuditObject(ao) ;
  return buildClientResponse(tx, ao) ;
}
```

At the ingress layer, a request handler can invoke the kernel and enforce the PASS gate to downstream systems, as illustrated by the following pseudocode:

```
async function handleContainRequest(httpReq:
HttpRequest) : Promise<HttpResponse> {
  const body = httpReq.body;
```

-continued

```
const request: ContainmentRequest = {
domainProfileId: body.domainProfileId,
inputText: body.text,
context: body.context | | { } ,
actorIdentity: httpReq.userId
} ;
const result: ContainmentResult = await
runContainment (request) ;
if (result.decision.action === "PASS") {
await forwardToDownstreamSystem (result) ;
}
return {
statusCode: 200,
body: {
decision: result.decision.action,
warning: result.decision.warning | | null,
stabilityScore: result.stabilityScore,
stabilityLabel: result.stabilityLabel,
rationale: result.rationale
}
} ;
}
```

Audit object builder 38 receives build instructions for PASS and non PASS outcomes. In response, the builder 38 takes the transaction object fields and constructs a canonical audit object. The audit object includes the transaction identifier, timestamp, actor identity, domain profile identifier, normalized text, context, containment stability score, containment stability label, heuristic sub scores, model stability score, rationale object, reflection object if present, decision action, and any warnings or escalation directives. The builder 38 organizes these fields according to a standard schema. For example, the schema may include distinct sections for inputPayload, containmentAnalysis, decision, and metadata.

Once the audit object has been assembled, the builder 38 canonicalizes it into a deterministic representation. Canonicalization procedures ensure that the same logical contents always result in the same serialized bytes regardless of serialization order or formatting environment. Techniques may include lexicographically sorting keys in nested structures, normalizing whitespace, encoding strings in UTF-8, and using fixed decimal or integer representations for numbers. After canonicalization, a cryptographic hash function such as SHA-256 is applied to the byte representation to yield a cryptographic seal. The seal is then stored as a field within the audit object itself. The presence of the seal means that any subsequent change to any field in the audit object would change the canonical representation and therefore the recomputed seal, making tampering detectable.

In one illustrative implementation, canonicalization and seal computation can be expressed by the following pseudocode, where keys are sorted recursively and a cryptographic hash is applied to the canonical byte sequence:

```
function canonicalizeAO(ao: AuditObject) : string
{
const sorted = sortKeys Recursively (ao) ;
return JSON.stringify(sorted) ;
}
function computeSeal(ao: AuditObject) : string {
const canonical = canonicalizeAO(ao) ;
return hashBytes(canonical, "SHA-256") ;
}
```

Figure 3:
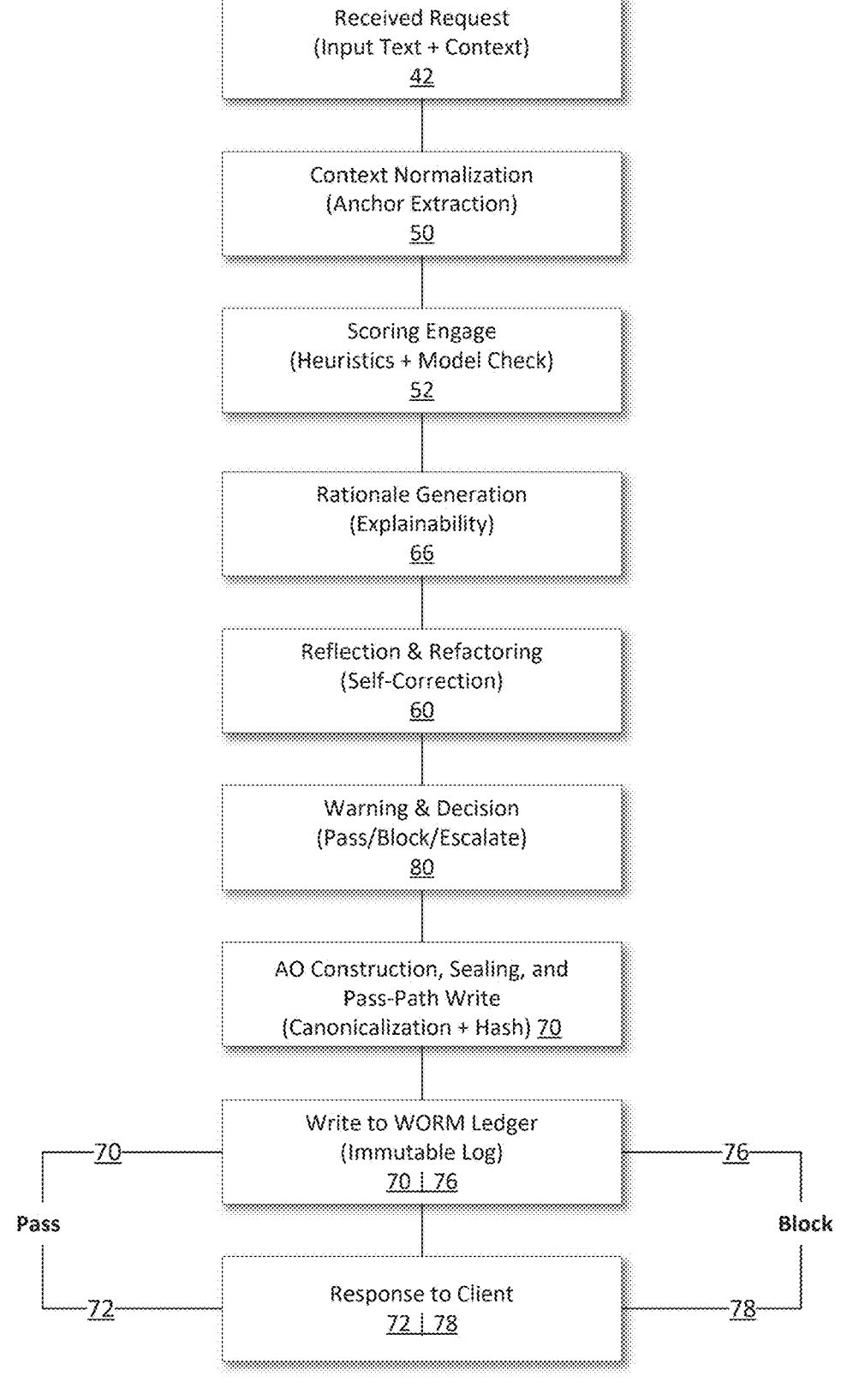
FIG. 3 is a flowchart showing an example symbolic containment pipeline including request receipt, context normalization, scoring operations, rationale formation, reflection and refactoring, warning and decision stages, audit object sealing, ledger writing, and client response paths.

The builder 38 then issues a write operation to WORM ledger 22, as represented by write steps 70 and 76 in FIG. 3. In a representative implementation based on a NoSQL database, the ledger table uses recordId as a partition key and may optionally include a timestamp as a sort key. The write operation is constrained by a conditional expression that asserts that no existing item with the same recordId is present. If the condition fails, the write is rejected. Write permissions are restricted so that only the CCP kernel 16, running under an appropriate role, may insert items. Update and delete permissions are disabled or heavily restricted to audit roles that never modify audit content. This design yields logical write once read many behavior.

After the audit object has been successfully written, the CCP kernel 16 returns a response to the requesting client. As indicated in FIG. 3, for PASS decisions the system returns a response 72 that may include the stability score, stability label, selected decision, and an excerpt of the rationale. For BLOCK or ESCALATE decisions, the system returns a response 78 that describes why the text could not proceed and may provide suggestions or a refactored version of the text when allowed by policy. In either case, the response can include a record identifier allowing auditors to retrieve the corresponding audit object later.

The verification API 24 allows auditors, regulators, or integrity checking services to verify that audit objects in the WORM ledger 22 have not been altered since creation. When a verification request arrives containing a recordId, the verification API 24 performs a read audit object operation 23 to retrieve the stored audit object. To recompute the seal, the verification API 24 removes or ignores the stored cryptographic seal field, canonicalizes the remaining fields using the same deterministic procedure used during initial writing, and computes a fresh hash. If the recomputed hash matches the stored cryptographic seal, the audit object is considered verified. If not, the verification API 24 reports that the record fails integrity checks, indicating possible corruption or unauthorized modification in the ledger or communication path.

One exemplary verification routine that recomputes the seal and compares it to the stored value can be written as:

```
async function verifyAuditObject(recordId:
string) : Promise<{ verified: boolean }> {
const ao = await ledgerGet(recordId) ;
if (!ao) {
return { verified: false } ;
}
const { cryptographicSeal, . . . aoWithoutSeal } =
ao;
const recomputedSeal = computeSeal (aoWithoutSeal
as AuditObject) ;
const verified = recomputedSeal ===
cryptographicSeal;
return { verified } ;
}
```

FIG. 4 depicts the relationship between domain profile 82 and audit objects 84*a* and 84*b*. The domain profile 82 includes at least a primary key such as domainProfileId, a minimum pass score, a block score, and arrays of requiredAnchors and forbiddenPatterns. It may also include escalationPolicy rules that describe when to notify human reviewers or trigger secondary oversight in response to unstable or high risk language. When a transaction is processed, the scoring component 32 and decision component 36 refer to the active domain profile 82 to interpret feature values and thresholds.

For example, a domain profile for an incident remediation ledger might specify that the minimum pass score is eighty on a normalized scale, the block score is forty, and required anchors include ticketId, rootCause, and expectedOutcome. The same profile may define forbidden patterns that prohibit language such as personal guarantees or unbounded commitments. When the incident narrative arrives, the kernel 16 evaluates it according to these rules. If the narrative references the ticketId in structured context but not in text, the anchor coverage might be partial. If the narrative states that an issue was fixed but does not describe how or why, the omission flag may be set. If the model detects contradictory statements about which subsystem was affected, the contradiction flag may be set. The scoring engine aggregates these signals and the decision component 36 compares the resulting score and flags against the domain profile thresholds. If the score is eighty five with no fatal flags, the decision is PASS and an audit object similar to 84*a* is created. If the score is thirty with multiple omissions, the decision is BLOCK and an audit object similar to 84*b* records the denial and reasons.

In one illustrative implementation, a domain profile and an anchor extraction routine can be represented using data structures and pseudocode such as the following. This representation is not limiting, but shows one way to compute an anchor coverage feature by checking whether required anchors appear in both structured context and normalized text:

```
type DomainProfile = {
id: string;
domainName: string;
requiredAnchors: string [ ]; // ["ticketId", "why",
"expectedOutcome"]
minPassScore: number;
blockScore: number;
weights: { w1: number; w2: number; w3: number; w4:
number; w5: number };
highAmbiguityTerms: string[ ]; // ["issue", "problem",
"thing", . . . ]
} ;
type Anchors = { [name: string] : boolean } ;
function extractAnchors(
normalizedText: string,
context: any,
profile: DomainProfile
) : { anchors: Anchors; anchorCoverage: number } {
const anchors: Anchors = { } ;
let presentCount = 0;
for (const name of profile.requiredAnchors) {
const inContext = context && context [name] != null;
const inText =
normalizedText.includes (String (context?.[name] | |
"") ) ;
const present = inContext && inText;
anchors [name] = present;
if (present) presentCount += 1;
}
const anchorCoverage =
profile.requiredAnchors.length === 0
? 1
: presentCount / profile.requiredAnchors.length;
return { anchors, anchorCoverage } ;
}
```

The domain profile 82 effectively governs how containment decisions are made and how audit objects are interpreted. An organization may maintain several domain profiles, for example for financial command execution, policy communication, creative writing safety checks, and external regulatory filings. Each profile encodes the structure of what counts as a stable and complete narrative in that domain.

The model adapter 18 provides a model agnostic interface that decouples the CCP kernel 16 from any specific natural language model provider. The adapter 18 implements routing logic that selects an appropriate model 20 based on domain, request size, latency requirements, or available providers. It maps internal analysis requests into provider specific prompts, including instructions for the model to rate semantic stability, identify contradictions, highlight missing explanations, and propose revised text that meets explicit structural requirements.

In one embodiment, an analysis request includes the normalized text, a list of required anchors, a description of the desired fields in the rationale object, and a specification of what outputs should be returned. The adapter 18 then formats a structured prompt to an external model such as Claude or GPT. For example, it may request that the model return a numeric stability score between zero and one hundred, a list of sentences that contradict one another, bullet points summarizing missing anchors, and an improved narrative that fills the gaps. Upon receiving the model output, the adapter 18 parses the text or structured response, extracts the requested metrics, and populates the structured data 17 that is returned to scoring component 32. Because the scoring component 32 only sees normalized schema fields such as modelStabilityScore and inconsistencyFindings, it remains insulated from provider specific nuances.

The same adapter 18 may be used for rationale generation and reflection. For instance, after a stability score has been calculated, the kernel 16 can supply the score, subscores, and domain profile constraints to the adapter 18 and request a concise explanation intended for human auditors. The adapter 18 obtains this explanation from the model 20 and returns it as part of the rationale object. For reflection, the kernel 16 can provide the original text and rationale to the adapter 18 and request a self assessment that points out any blind spots or unaddressed risks. The returned reflection object may then be stored in the audit object and used to train future domain profiles.

In one representative embodiment, the invention is deployed on a cloud platform using serverless components. The API gateway 14 exposes routes such as a containment endpoint and a verification endpoint. The CCP kernel 16 and model adapter 18 are implemented as stateless compute functions, for example using managed function services. The WORM ledger 22 is implemented as a managed key value store such as a DynamoDB table with recordId as a primary key. The external model 20 is provided as a managed model service such as an LLM accessible through a platform like Bedrock.

When a client sends a POST request to the containment endpoint with domainProfileId, inputText, context, and an authentication token, the API gateway 14 authenticates the token and forwards a validated payload to the CCP kernel 16. The kernel 16 initializes a transaction, passes through the pipeline as previously described, writes the resulting audit object to WORM ledger 22, and returns an outcome to the client. The entire process is designed to complete within a bounded latency window that is short enough to be compatible with administrative console operations.

In one reduction to practice, the methods described herein were implemented in a working prototype deployed on a cloud platform as a service used for incident and risk event decisions. The implementation used API gateway endpoints for containment and verification routes, stateless compute functions for the CCP kernel, the model adapter, and verification logic, an external large language model service for structural assessment and refactoring prompts, and a managed key value store table configured as a write once read many ledger. In operation, inputs such as "Fixing error."

without any ticket identifier produced a low stability score, a breach label, and a BLOCK decision that prevented execution, while inputs such as "Applying patch per Ticket #123 to resolve memory leak in service X," with context including ticketId TCK-123, produced higher stability scores, stable labels, PASS decisions, and sealed audit objects stored in the ledger.

The invention can be applied in multiple domains without changing core logic. In an incident and risk event decision ledger, a domain profile can require that every remediation action be tied to a specific ticket identifier, that the cause of the incident be described in a way that aligns with internal taxonomies, and that the expected outcome of the remediation be clearly stated. The CCP kernel 16 blocks vague entries such as "fixed issue" that omit required detail and only allows those that meet structural requirements. Regulators and internal audit teams can later verify that every approved remediation command recorded in downstream systems 26 has a corresponding sealed audit object in ledger 22 documenting the narrative justification.

In a financial operations domain, a domain profile can require explicit anchors for an invoice number, a counterparty identifier, and a payment amount before a payment approval narrative is accepted. For example, an operator might submit the text "Please pay the outstanding invoice for Acme this week" with context that omits both invoice number and amount. The context normalization stage binds the request to a financial domain profile that lists invoiceId and amount as requiredAnchors. Anchor extraction fails to find these anchors in either the structured context or the normalized text, yielding a low anchor coverage value and setting a missingRequiredAnchor flag. The symbolic containment scoring engine therefore computes a low containment stability score, assigns a BREACH or UNSTABLE label, and the decision engine selects a BLOCK action. A corresponding audit object records that the payment request was blocked because required anchors were missing.

By contrast, an operator might submit "Approve payment of USD 4,250 on invoice INV-78432 to Acme Manufacturing, due March 31," with structured context that already contains the invoiceId and amount fields. In that case, the anchor extraction function reports full anchor coverage, the entropy score remains low because there are no high ambiguity terms, and the model assisted analysis confirms that the narrative clearly describes who is paid, how much, and on what basis. The containment stability score exceeds the minimum pass score defined in the financial operations domain profile, the label is STABLE, and the decision engine sets the decision action to PASS. The CCP kernel writes a sealed audit object capturing the payment narrative, score, label, and decision and forwards the approved instruction to the downstream payment system.

In an incident response domain, a brief narrative such as "Fixed the issue, everything is fine now" will be treated as structurally unstable. The corresponding domain profile may require explicit reference to a case identifier, affected service, cause of the incident, and expected outcome. When this vague text is analyzed, entropy is high due to generic terms like "issue," required anchors such as ticketId and rootCause are missing, and the omission flag is set. The system therefore assigns a low containment stability score and blocks the narrative from serving as the sole justification for a change in an incident ledger. The refactor stage can generate a proposed rewrite such as "Applying patch per Ticket #123 to resolve memory leak in service X, expected to reduce error rate from 5% to less than 0.1%," which includes the required anchors. When the refactored text is re-scored, the stability score increases above the pass threshold, and a PASS decision is recorded along with both the original and refactored narratives in the audit object.

In a corporate governance communication domain, a domain profile may emphasize tone and liability aware language. The symbolic containment scoring engine flags drafts that contain unconditional guarantees, admissions of fault inconsistent with corporate policy, or references to unsupported numbers. The reflection and refactoring stage can propose alternative phrasing that maintains intent while avoiding language that would increase legal exposure. The ledger 22 records both the original unstable drafts and the final approved communications, providing an evidentiary trail of how governance communications were stabilized over time.

In an internal corporate governance communication domain, a domain profile may encode both required anchors and forbidden phrasing to manage legal exposure. For example, a draft such as "We guarantee that no customer will ever lose funds under this program" may be flagged as unstable because it contains an unconditional guarantee phrase prohibited by the domain profile and omits required anchors such as a policy identifier and a description of residual risk. The omission flag and a forbidden phrase flag drive the containment stability score below the block score, resulting in a BLOCK decision and a sealed audit object recording the unstable draft. A refactored version such as "This program is designed to reduce operational risk in accordance with Policy GOV-214, but residual risk remains and is managed under our standard risk framework" satisfies the required policy reference anchor, removes the guarantee language, and explicitly acknowledges residual risk. When re-evaluated, the refactored text receives a higher containment stability score that exceeds the minimum pass score, yields a STABLE label, and produces a PASS decision recorded in the audit ledger.

In a creative writing domain, particularly for trauma sensitive narratives, a domain profile may focus on semantic stability, coherence of timelines, and avoidance of narrative collapse. The engine identifies passages that abruptly shift tense, lose referents, or introduce looping paradoxical structures. The model adapter 18 suggests rewrites that restore continuity and provide more stable framing. Even though such a domain may not involve high stakes operational commands, the same symbolic containment process yields safer and more structured outputs that can be tracked over revisions.

In some embodiments, an adversarial corpus of narratives is used to tune domain profiles and heuristic functions. This corpus can include examples of ambiguous, evasive, or adversarial texts that are known to defeat simple keyword filters and sentiment classifiers. By running the symbolic containment pipeline against these narratives, system designers can calibrate entropy metrics, penalty weights, and thresholds such that unstable narratives are consistently flagged by the engine. The corpus can include paradoxical loops, recursive justifications, and intentionally vague statements. This tuning step does not form part of routine operation for end users but improves the robustness of the profiles.

Although many examples herein assume the presence of an external LLM 20, the invention is not restricted to any particular model type. Structural analysis may also be performed by classical rule based engines, graph based contradiction finders, or smaller task specific models. In low resource environments, the system may rely more heavily on deterministic heuristics and use model assistance only when a transaction falls into a gray area of scores. In other environments, multiple models may be used in ensemble fashion, and the model adapter 18 may aggregate their outputs into a unified stability metric.

Similarly, the WORM ledger 22 can be realized using different technologies. An organization with existing log infrastructure may choose to implement the ledger as an append only stream to which audit objects are written, combined with a secondary indexing system for retrieval. Another organization may prefer to anchor the cryptographic seal of each audit object into a public blockchain at regular intervals, thereby providing an additional layer of tamper evidence. The canonicalization and hashing procedures described herein still apply in these embodiments, as they are independent of the specific ledger technology.

The CCP kernel 16 can be integrated with message buses, service meshes, or orchestration frameworks. For example, instead of directly forwarding commands to downstream systems 26, the kernel 16 can place messages on a command queue that is consumed by worker services. Those worker services can verify that the command is associated with a PASS audit object whose recordId matches the reference embedded in the command message prior to executing the command. This additional verification step further ensures that no command bypasses the containment protocol.

Figure 5:
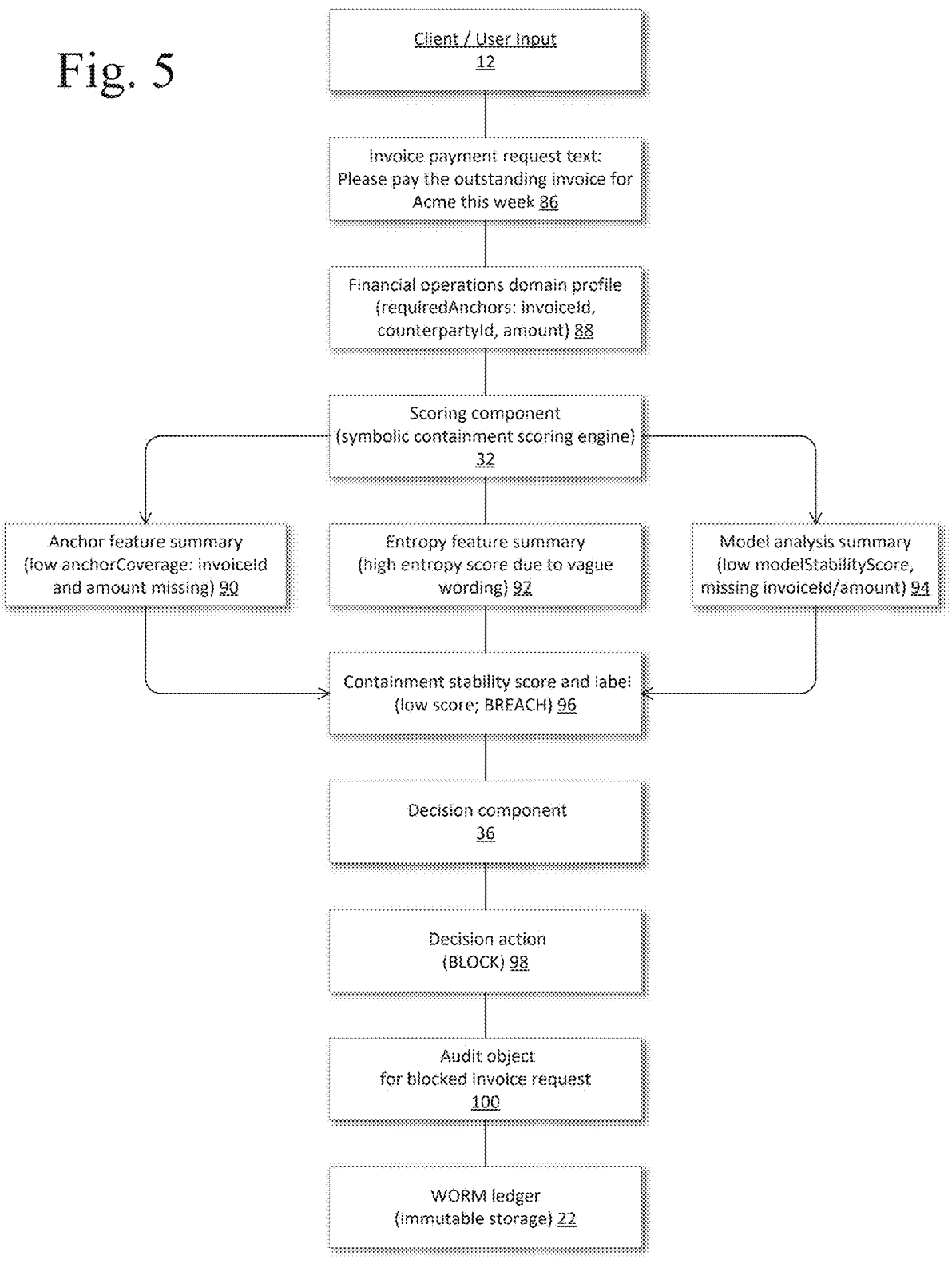
FIG. 5 is a diagram illustrating an example application of the symbolic containment firewall to a financial operations narrative, showing how an incomplete invoice payment request is analyzed, scored, blocked, and recorded in a canonical audit object.

In FIG. 5, an example financial operations narrative is evaluated by the canonical containment protocol. An invoice payment request 86 contains the text "Please pay the outstanding invoice for Acme this week" and is associated with structured context that omits an invoice identifier and payment amount. The request 86 is bound to a financial operations domain profile 88 that specifies required anchors including invoiceId, counterpartyId, and amount, as well as minimum pass and block scores and high entropy markers for vague phrasing.

As the request passes through the symbolic containment scoring engine 32, an anchor feature summary 90 is generated that indicates an anchorCoverage value less than one because neither invoiceId nor amount appears in the structured context or in the normalized text. An entropy feature summary 92 indicates a relatively high entropy score based on the presence of generic wording such as "outstanding invoice" without any specific identifier. A model analysis summary 94 from the model adapter 18 reports a low modelStabilityScore and inconsistency findings that the narrative does not specify which invoice should be paid or how much should be transferred.

The scoring engine 32 aggregates these features into a containment stability score and containment stability label 96 using the domain profile 88 weighting parameters. In this example, the stability score falls below the block score and the label is set to BREACH. The decision engine 36 therefore selects a decision action 98 of BLOCK for the invoice payment request 86. An example audit object 100 is shown containing the input text and context, the anchor feature summary 90, the entropy feature summary 92, the model analysis summary 94, the resulting containment stability score and label 96, the decision action 98, and a cryptographic seal, all of which are written to the write once read many ledger 22.

FIG. 6 illustrates an example incident remediation narrative evaluated by the same canonical containment protocol. An incident remediation entry 102 contains the text "Applying patch per Ticket #123 to resolve memory leak in service X, expected to reduce error rate from 5% to less than 0.1%," and is associated with structured context that includes a ticketId field set to "TCK-123" and an affectedService field set to "service X." The entry 102 is bound to an incident remediation domain profile 104 that defines required anchors including ticketId, affectedService, rootCause, and expectedOutcome, along with threshold values for pass and block decisions.

Anchor extraction within the scoring engine 32 produces an anchor feature summary 106 that reports full anchorCoverage because the required anchors appear in both structured context and normalized text. An entropy feature summary 108 shows a relatively low entropy score, reflecting the absence of high entropy markers and the presence of concrete identifiers and expected results. A model analysis summary 110 from the model adapter 18 reports a high modelStabilityScore and indicates that the narrative clearly identifies the ticket, the technical issue, and the expected impact of the remediation.

The scoring engine 32 aggregates these features into a containment stability score and containment stability label 112 that exceed the minimum pass score in the incident remediation domain profile 104 and produce a label of STABLE. Based on the score and flags, the decision engine 36 selects a decision action 114 of PASS for the incident remediation entry 102. An example audit object 116 is shown that includes the incident narrative 102, context fields, the anchor feature summary 106, the entropy feature summary 108, the model analysis summary 110, the containment stability score and label 112, the PASS decision action 114, and a cryptographic seal, with the audit object 116 stored in the write once read many ledger 22.

Figure 7:
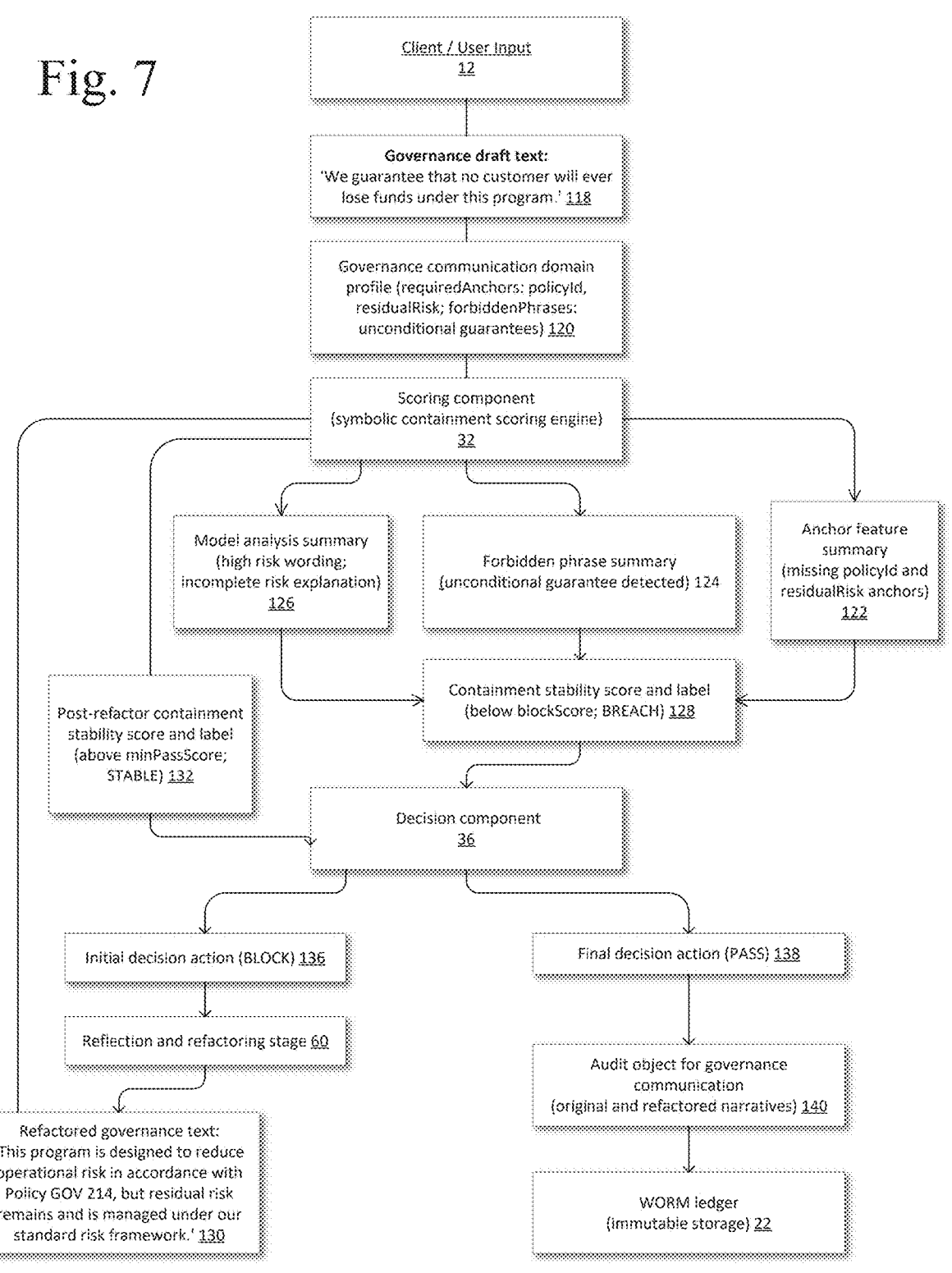
FIG. 7 is a diagram illustrating an example application of the symbolic containment firewall to a governance communication draft, showing how an unstable draft with forbidden phrasing is analyzed, blocked, refactored, re scored, and recorded in a canonical audit object.

In FIG. 7, an internal governance communication draft is evaluated and refactored using the canonical containment protocol. A client or user input 12 provides a governance draft text 118 such as "We guarantee that no customer will ever lose funds under this program." The draft is associated with a governance communication domain profile instance 120 that specifies required anchors including a policy identifier and a description of residual risk, and that encodes forbidden phrasing such as unconditional guarantees. The draft text 118 and the domain profile 120 are provided to the symbolic containment scoring engine implemented by scoring component 32.

As the governance draft is analyzed, an anchor feature summary 122 is generated that indicates that required anchors such as policyId and residualRisk are missing from both structured context and normalized text, which results in a low anchorCoverage value and a missingRequiredAnchor flag. A forbidden phrase summary 124 indicates that the text contains an unconditional guarantee phrase that is listed as a forbidden pattern in the governance communication domain profile 120. A model analysis summary 126 returned from the model adapter 18 reports a low modelStabilityScore and highlights that the draft does not reference any governing policy and fails to acknowledge residual risk.

The scoring component 32 aggregates the anchor feature summary 122, the forbidden phrase summary 124, and the model analysis summary 126, together with any heuristic features for entropy, to compute a containment stability score and containment stability label 128 for the governance draft 118. In this example, the containment stability score falls below a blockScore defined in the governance communication domain profile 120, and the label is set to BREACH. The stability score and label 128 are provided to decision component 36, which selects an initial decision action 136 of BLOCK for the governance draft.

The BLOCK decision 136 causes the transaction to enter a reflection and refactoring stage 60. In this stage, the kernel supplies the draft, the domain profile 120, and the rationale to the model adapter 18 and requests a stabilized rewrite that satisfies domain requirements. The model adapter 18 returns a refactored governance text 130 such as "This program is designed to reduce operational risk in accordance with Policy GOV 214, but residual risk remains and is managed under our standard risk framework." The refactored governance text 130 includes the required policy reference anchor, removes the unconditional guarantee phrasing, and explicitly describes residual risk management.

The refactored governance text 130 is re analyzed by the scoring component 32 using the same symbolic containment scoring pipeline. Anchor extraction now reports full coverage for required anchors, the forbidden phrase summary indicates that no forbidden phrases are present, and the model analysis summary indicates that the narrative clearly references a governing policy and residual risk. These features are combined into a post refactor containment stability score and label 132 that exceed the minimum pass score in the governance communication domain profile 120 and yield a stability label such as STABLE. Decision component 36 receives the updated score and label 132 and selects a final decision action 138 of PASS for the refactored governance communication.

An audit object 140 is then constructed that includes the original governance draft 118, the refactored governance text 130, the anchor feature summaries 122, the forbidden phrase summary 124, the model analysis summaries 126, the pre refactor and post refactor containment stability scores and labels 128 and 132, the initial BLOCK decision 136, and the final PASS decision 138, along with a cryptographic seal computed over a canonical representation of the audit object contents. The sealed audit object 140 is written to the write once read many ledger 22 so that auditors can later verify how the unstable communication was refactored into an approved governance message.

Figure 8:
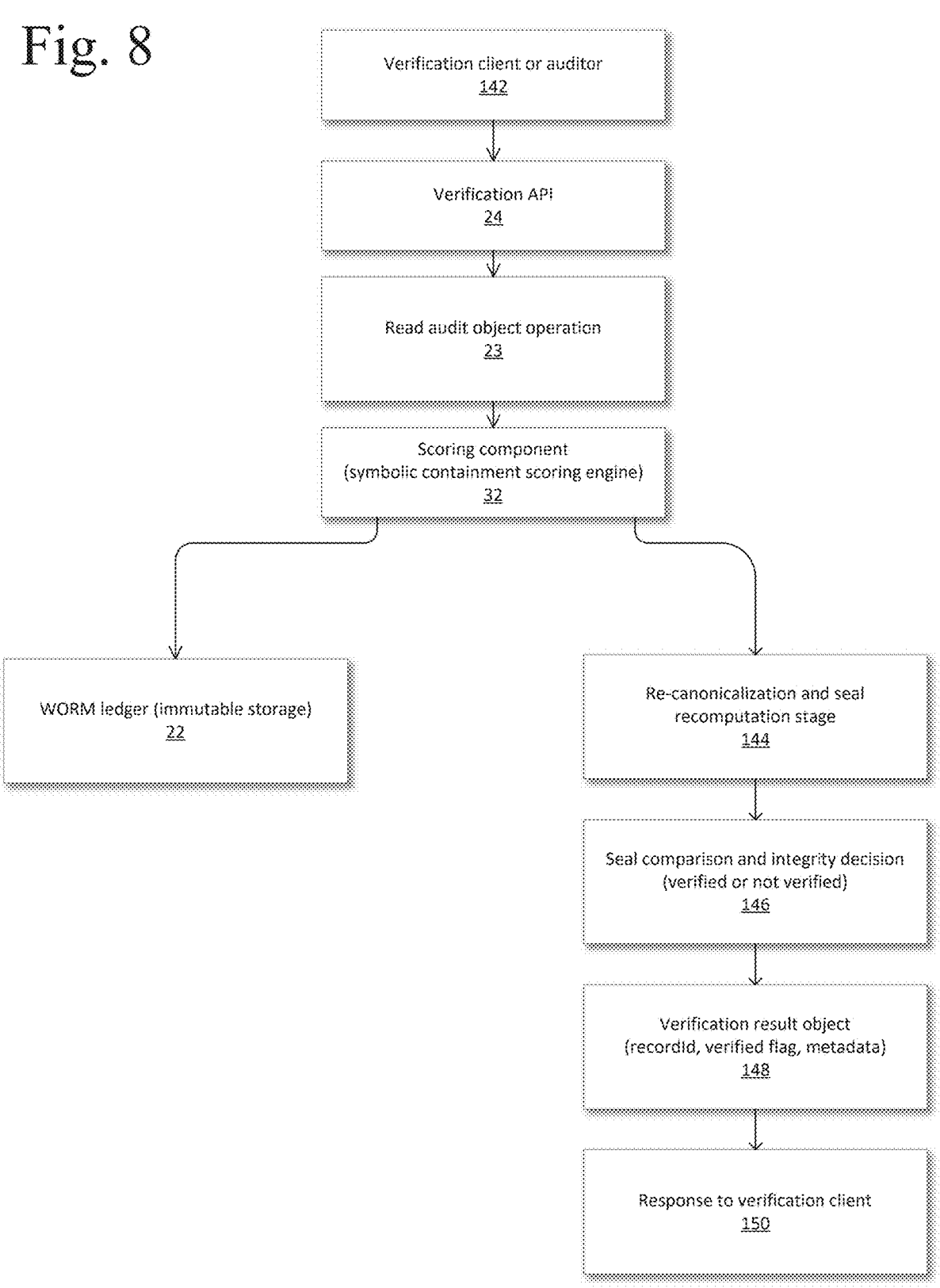
FIG. 8 is a flowchart illustrating an example verification workflow in which a verification client requests integrity checking of a stored audit object, the audit object is re canonicalized and re sealed, and a verification result is returned.

FIG. 8 illustrates an example verification and integrity checking workflow for stored audit objects. A verification client or auditor 142 issues a verification request to verification API 24, for example by supplying a record identifier associated with a previously stored audit object. In response, the verification API 24 initiates a read audit object operation 23 that retrieves a sealed audit object from the write once read many ledger 22. The retrieved audit object is then provided to a re canonicalization and seal recomputation stage 144.

In the re canonicalization and seal recomputation stage 144, the verification logic removes or ignores the stored cryptographic seal field within the retrieved audit object and applies the same deterministic canonicalization procedure used at creation time to produce a canonical byte representation of the remaining content. The verification logic then applies a cryptographic hash function to this canonical representation to produce a recomputed seal. The recomputed seal and the stored seal are then supplied to a seal comparison and integrity decision stage 146. If the recomputed seal matches the stored seal, the stage 146 determines that the audit object has not been modified since it was written to the ledger 22 and sets a verified flag. If the recomputed seal does not match the stored value, the stage 146 determines that the audit object fails integrity checks.

The outcome of the comparison stage 146 is captured in a verification result object 148 that includes at least the record identifier, a verified flag, and optional metadata such as timestamps and error information. A response 150 is returned from the verification API 24 to the verification client or auditor 142 and includes the verification result object 148. In this way, FIG. 8 illustrates how the same canonicalization and sealing procedures used by the containment pipeline are reused by the verification interface to provide strong integrity guarantees for stored audit objects in the write once read many ledger 22.

In the aforementioned detailed description of the present invention, reference is made to the accompanying drawings, which form a part thereof, and within which are shown by way of illustration specific embodiments by which the invention may be practiced. Numerous specific details are set forth to provide a thorough description of the embodiments of the present invention. It will be apparent to one of ordinary skill in the art that some embodiments may be practiced without some of these specific details. It is to be understood that other embodiments may be utilized, and structural changes may be made without departing from the scope of the invention.

The following is a non-limiting list of reference numerals used in the drawings:

| Ref. No. | Description |
| --- | --- |
| 12 | Client/user input |
| 14 | API Gateway (ingress and authentication) |
| 16 | CCP kernel (orchestrator and symbolic containment engine) |
| 17 | Structured data returned from model adapter |
| 18 | Model adapter (provider-agnostic abstraction) |
| 19 | Analysis request sent to model adapter |
| 20 | External LLM (e.g., Claude, GPT) |
| 22 | WORM ledger (immutable storage) |
| 23 | Read audit object operation |
| 24 | Verification API (audit verification interface) |
| 26 | Downstream systems (database / operations) |
| 28 | Normalization component |
| 30 | Domain profile loading component |
| 32 | Scoring component |
| 34 | Refactor component |
| 36 | Decision component |
| 38 | Audit object builder |
| 42 | Request receipt/initial input event |
| 44 | Request validation and forwarding |
| 46 | Transfer to profile loader |
| 48 | Return of loaded domain profile |
| 50 | Context normalization and anchor extraction |
| 52 | Scoring engage operation |
| 54 | Model analysis request (loop call) |
| 56 | Model analysis response (loop return) |
| 58 | Scoring output handoff |
| 60 | Reflection and refactoring stage |
| 62 | Refactored text returned for re-scoring |
| 64 | Scoring context provided to refactor stage |
| 66 | Stability and analysis handoff to decision stage |
| 68 | Pass-path initiation toward audit object build |
| 70 | Audit object sealing and write to ledger |
| 72 | Response to client (pass) |
| 74 | Block/escalate initiation toward audit object build |
| 76 | Block/escalate write to ledger |
| 78 | Response to client (block/escalate) |
| 80 | Warning and decision stage |
| 82 | Domain profile |
| 84a | Audit object (example instance A) |
| 84b | Audit object (example instance B) |
| 86 | Example invoice payment request text |
| 88 | Financial operations domain profile instance |
| 90 | Anchor feature summary for invoice request |
| 92 | Entropy feature summary for invoice request |
| 94 | Model analysis summary for invoice request |
| 96 | Containment stability score and label for invoice request |
| 98 | Decision action for invoice request |
| 100 | Audit object for blocked invoice request |
| 102 | Example incident remediation narrative text |
| 104 | Incident remediation domain profile instance |
| 106 | Anchor feature summary for incident narrative |
| 108 | Entropy feature summary for incident narrative |
| 110 | Model analysis summary for incident narrative |
| 112 | Containment stability score and label for incident narrative |
| 114 | Decision action for incident narrative |

-continued

| Ref. No. | Description |
| --- | --- |
| 116 | Audit object for passed incident narrative |
| 118 | Governance draft text (unstable) |
| 120 | Governance domain profile instance |
| 122 | Governance anchor feature summary |
| 124 | Forbidden phrase summary |
| 126 | Governance model analysis summary |
| 128 | Pre-refactor stability score/label |
| 130 | Refactored governance text |
| 132 | Post-refactor stability score/label |
| 136 | Initial BLOCK decision |
| 138 | Final PASS decision |
| 140 | Governance audit object |
| 142 | Verification client or auditor |
| 144 | Re-canonicalization stage |
| 146 | Seal comparison decision |
| 148 | Verification result object |
| 150 | Response to verification client |

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "approximately." As used herein, "approximately" refers to being within an acceptable error range for the particular value as determined by one of ordinary skill in the art, which will depend in part on how the value is measured or determined. When an acceptable range is not dictated by the one of ordinary skill in the art, "approximately" refers to +15% of the numerical when used in connection with particular values; it should be understood that a numerical including an associated range with a lower boundary of greater than zero must be a non-zero numerical, and the term "approximately" should be understood to include only non-zero values in such scenarios.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

Glossary of Claim Terms

Ambiguity terms means a defined set of words, phrases, or constructions associated with vague, evasive, or linguistically unstable language in a given domain, such as generic nouns without referents or unexplained actions. A domain profile associates these terms with that domain. The symbolic containment scoring engine counts and weights occurrences of ambiguity terms to compute an entropy feature that reflects how much unresolved or unstable language appears in the normalized text for a transaction.

Anchor coverage value means a numeric feature that represents how completely a narrative references required anchors defined for a domain. In typical embodiments, the system determines whether each required anchor is present in both the structured context and the normalized text, increments a present count for anchors that appear in both, and divides that count by the total number of required anchors. The resulting ratio is used as an input to the containment stability score.

Audit object means a canonical, machine readable record representing a single evaluated text transaction, including at least the domain profile identifier, normalized text, optional context or context reference, heuristic features, model stability score, containment stability score, containment stability label, decision action, any rationale object, any reflection object, any refactored text, and a cryptographic seal. The audit object is serialized in a deterministic format, written to a write once read many ledger, and later used for verification and compliance review.

Canonical containment protocol kernel means an orchestration component that implements the defined stages of the canonical containment protocol, including ingress handling, context normalization, symbolic containment scoring, rationale and reflection processing, decision selection, audit object construction, canonicalization, sealing, and ledger write. The kernel typically operates as a stateless service that accepts a request, creates a transaction object, invokes subcomponents such as the symbolic containment scoring engine and model adapter, and returns a decision together with summary analysis.

Containment stability label, sometimes referred to herein as a stability label, means a categorical classification assigned to a text event based on its containment stability score and domain specific thresholds. Examples include labels such as stable, unstable, or breach, or equivalent tiered categories. A domain profile defines the mapping from score ranges and flags to labels. The label summarizes semantic stability and containment in a form suitable for routing, user display, escalation policies, and audit, and is stored as part of the audit object.

Containment stability score means a numeric value that quantifies how well a narrative satisfies symbolic containment criteria for a domain. The score is computed by aggregating heuristic features, such as entropy and anchor coverage, with a model stability score returned from a structural analyzer, using weights defined in a domain profile and penalty terms for omissions or contradictions. The resulting score is compared with minimum pass and block thresholds to drive the decision action and containment stability label.

Cryptographic seal means a value produced by applying a cryptographic hash function or equivalent one way function to a deterministic representation of an audit object. In typical implementations, the audit object is canonicalized into sorted and normalized bytes, hashed using an algorithm such as SHA 256 or similar, and the resulting digest is stored as the cryptographic seal field. Any change to the underlying audit object content alters the seal, enabling later verification of integrity by recomputing the seal.

Decision action means the classification assigned by the decision engine that indicates how a system should treat a given text transaction with respect to downstream execution. Examples include pass, block, escalate, or log only, although fewer or additional categories may be defined. The decision action is determined from the containment stability score, containment stability label, and flags in view of thresholds in the domain profile, and is stored and enforced through the audit object and downstream execution controller.

Domain profile means a configuration object associated with a particular operational or narrative domain that parameterizes the symbolic containment pipeline. A domain profile typically includes a domain identifier, required anchors, minimum pass and block scores, score to label mappings, feature weights, ambiguity terms, and domain specific lexicons or patterns. The canonical containment protocol kernel loads the appropriate domain profile for each request and uses it to interpret features, compute the containment stability score, and apply decision and escalation rules.

Downstream execution controller means a component that receives the decision action and selected outputs from the containment pipeline and governs whether and how a requested operation is forwarded to a downstream execution system. The controller enforces a pre commit gate such that only transactions with a decision action of pass, and optionally satisfying other policy conditions, are allowed to modify state in the target system. Block and escalate decisions prevent or defer execution while still recording the event in the audit object.

Downstream execution system means any computerized system, service, or process whose state or behavior may be modified as a result of a natural language transaction that has passed through the symbolic containment pipeline. Examples include administrative consoles, incident response systems, databases, approval workflows, risk ledgers, or publication platforms. The system is treated as external to the canonical containment protocol kernel, and access to it is mediated by the downstream execution controller based on containment decisions.

Ingress interface means the externally facing interface through which clients submit containment or verification requests to the canonical containment protocol kernel. In many embodiments, the ingress interface is implemented as an authenticated HTTP or REST endpoint that validates request schemas, enforces rate limits, attaches actor identity, and forwards normalized request objects to the kernel. The ingress interface thus forms the controlled entry point for text, context, and domain profile identifiers into the symbolic containment pipeline.

Model adapter means an abstraction layer that connects the symbolic containment scoring engine to one or more external language models or structural analyzers in a provider agnostic way. The model adapter receives a provider neutral analysis request that includes normalized text and domain cues, selects an appropriate provider according to routing policies, constructs a provider specific request, invokes the provider API, and normalizes the provider response into a fixed internal schema containing at least a model stability score and inconsistency findings.

Model stability score, also referred to as a model assisted structural stability score, means a numeric value returned or derived from a model based structural analysis of the normalized text, indicating coherence, completeness, and structural alignment with domain criteria. The model stability score is typically produced by a large language model or similar analyzer via the model adapter, based on prompts that include the text and domain cues. This score is combined with deterministic heuristic features in the symbolic containment scoring engine to compute the overall containment stability score.

Rationale object means a structured representation of the primary and secondary reasons for a particular containment stability label and decision action. The rationale object may include references to entropy, anchor coverage, model stability, detected omissions, or contradictions, along with concise explanatory statements. It can be generated by deterministic logic, by a model via the model adapter, or by a combination of both. The rationale object is included within the audit object and may be partially exposed to end users or auditors.

Reflection object means a structured representation capturing self assessment of the containment analysis and potential improvements or risk factors not fully expressed in the original rationale. The reflection object may be generated by prompting a model with the normalized text, current scores, and domain requirements to identify misinterpretations, missing anchors, or underappreciated risks. It can also be linked to refactored text proposed to improve stability, and it is stored within the audit object for use in review, training, or iterative tuning.

Stateless orchestration kernel means a deployment of the canonical containment protocol kernel that processes each containment request as an independent transaction without retaining conversational memory or long term state across invocations. The kernel reconstructs all necessary context from the incoming request, loads the relevant domain profile, runs the symbolic containment pipeline, writes the audit object, and returns a decision. This stateless behavior simplifies scaling, isolation, and security considerations for high assurance deployments.

Symbolic containment scoring engine means the component within the canonical containment protocol kernel that computes the containment stability score and associated label for a text transaction. The engine extracts heuristic features such as entropy scores, anchor coverage, and flags, invokes the model adapter to obtain a model stability score and structural findings, and aggregates these values using weight parameters and penalty terms defined in the domain profile. Its outputs drive the decision action selection and audit object construction.

Verification interface means an interface, such as an API endpoint or service method, that allows clients or auditors to verify the integrity of a stored audit object. The verification interface typically accepts a record identifier, retrieves the corresponding audit object from the write once read many ledger, re canonicalizes the audit object content, recomputes a cryptographic seal, compares the recomputed seal with the stored seal, and returns a verification result along with relevant metadata, without altering the underlying ledger entry.

Write once read many ledger means a data storage system configured so that each audit object, once committed, cannot be overwritten or modified, and deletion is restricted or controlled to provide effective immutability. Implementations may use database tables with conditional writes and strict access controls, storage systems with append only semantics, or other mechanisms. The ledger stores sealed audit objects for all evaluated transactions and supports later retrieval and verification of containment decisions for compliance and forensic purposes.

It is also to be understood that the following claims are intended to cover all of the generic and specific features of the invention herein described, and all statements of the scope of the invention that, as a matter of language, might be said to fall therebetween.

What is claimed is:

1. A computer implemented method of enforcing symbolic containment for a natural language transaction, the method comprising:

a. receiving, by an ingress interface, a request comprising input text, optional structured context, and a domain profile identifier;

b. loading, by at least one processor, a domain profile associated with the domain profile identifier, the domain profile specifying required anchors, threshold values, and weighting parameters;

c. normalizing, by the at least one processor, the input text to generate normalized text and extracting, from the normalized text and the structured context, candidate anchors, and setting at least one flag indicating whether required anchors are missing;

d. computing heuristic features that include an entropy score based on high entropy markers in the normalized text, an anchor coverage value that represents how many required anchors are present, and one or more flags that indicate omissions or self contradictions;

e. invoking, by the at least one processor, a model adapter that sends the normalized text and domain cues to a language model or other structural analyzer and receives a model stability score and inconsistency findings;

f. aggregating, by a symbolic containment scoring engine executed by the at least one processor, the heuristic features and the model stability score according to the weighting parameters in the domain profile to produce a containment stability score and a containment stability label;

g. selecting, by a decision engine, based on the containment stability score, the stability label, and the at least one flag, a decision action that includes one of pass, block, or escalate and optionally generating a refactored text that satisfies requirements in the domain profile;

h. constructing, by the at least one processor, an audit object that includes the domain profile identifier, the normalized text, the heuristic features, the model stability score, the containment stability score, the stability label, the decision action, any rationale, and any refactored text;

i. canonicalizing the audit object into a deterministic byte representation, computing a cryptographic seal over the deterministic byte representation using a cryptographic hash function, and embedding the cryptographic seal into the audit object;

j. assigning a record identifier to the audit object and writing the audit object into a write once read many ledger using a conditional write that rejects an attempted overwrite when the record identifier already exists; and k. controlling a downstream execution system so that modification of persistent state is delayed until after the audit object has been successfully written to the write once read many ledger and so that only requests associated with the decision action of pass are permitted to modify state in the downstream execution system.

2. The method of claim 1, wherein the domain profile defines high entropy markers comprising ambiguous terms and patterns, and the entropy score is computed based on occurrences of the high entropy markers relative to a total number of tokens in the normalized text.

3. The method of claim 1, wherein the domain profile specifies a minimum pass score, a block score, and one or more escalation thresholds, and the selecting comprises comparing the containment stability score to the minimum pass score, the block score, and the one or more escalation thresholds.

4. The method of claim 1, wherein the model adapter abstracts vendor specific language model interfaces and normalizes responses from different providers into a fixed internal schema used by the symbolic containment scoring engine.

5. The method of claim 1, further comprising re evaluating the refactored text by repeating the computing, invoking, and aggregating to produce a post refactor containment stability score stored in the audit object.

6. The method of claim 1, wherein the method is performed without persisting conversational state between different natural language transactions so that each transaction is evaluated on a self contained transaction object.

7. The method of claim 1, wherein the write once read many ledger is implemented using a key value store configured to reject writes that attempt to overwrite a record identifier that already exists.

8. The method of claim 1, further comprising training or calibrating the weighting parameters and the threshold values in the domain profile using an adversarial corpus of narratives that include paradoxical, recursive, or deceptive text patterns.

9. The method of claim 1, wherein the domain profile encodes required anchors selected from ticket identifiers, case identifiers, customer identifiers, or regulatory citations and further encodes role based escalation rules that route the escalate decision action to a human reviewer.

10. The method of claim 1, wherein the ingress interface receives the request from an authoring interface operated by a human or upstream generative model and the downstream execution system comprises at least one of an administrative console, a database, or a publication engine, and the method is executed between the authoring interface and the downstream execution system.

11. A system for symbolic containment of natural language transactions, comprising:

a. a client interface including at least one input endpoint that receives input text, optional context, and a domain profile identifier from a human user, an application, or a generative model;

b. an ingress application programming interface coupled to the client interface;

c. a domain profile store;

d. a write once read many ledger;

e. a downstream execution system; and f. at least one processor coupled to a non transitory memory storing instructions that, when executed by the at least one processor, cause the at least one processor to perform operations comprising:

g. loading, from the domain profile store, a domain profile that provides a domain profile associated with the domain profile identifier;

h. generating normalized text from the input text and extracting candidate anchors;

i. computing heuristic features, invoking model-adapter instructions to obtain a model stability score, and aggregating the heuristic features and the model stability score into a containment stability score and a stability label;

j. selecting a decision action including one of pass, block, or escalate and optionally generating a refactored text;

k. constructing a canonical audit object containing the normalized text, the domain profile identifier, the heuristic features, the model stability score, the containment stability score, the stability label, any rationale, the decision action, and any refactored text, and that computes a cryptographic seal over a canonical representation of the canonical audit object;

l. assigning a record identifier to the canonical audit object and storing the canonical audit object with the cryptographic seal in the write once read many ledger using a conditional write that rejects an attempted overwrite when the record identifier already exists; and m.

n. delaying modification of persistent state in the downstream execution system until after the canonical audit object has been stored in the write once read many ledger and permitting modification of persistent state only when the decision action is a pass decision.

12. The system of claim 11, wherein the non transitory memory further stores model-adapter instructions that, when executed by the at least one processor, cause the at least one processor to communicate with multiple language model providers and normalize responses into a fixed internal schema independent of provider.

13. The system of claim 11, wherein the write once read many ledger comprises a cloud hosted database configured with conditional writes that prevent modification of existing records.

14. The system of claim 11, further comprising a verification application programming interface having a network endpoint and verification instructions stored in the non transitory memory that, when executed by the at least one processor, cause the at least one processor to retrieve a stored canonical audit object by record identifier, remove or ignore a stored cryptographic seal field, re canonicalize remaining fields using the deterministic canonicalization procedure used to create the canonical representation, recompute the cryptographic seal, compare the recomputed cryptographic seal to the stored cryptographic seal, and output a verification result.

15. The system of claim 11, wherein the domain profile store maintains a plurality of domain profiles with different threshold values and anchor requirements for different domains selected from incident reporting, corporate governance communication, and creative writing.

16. A non transitory computer readable storage medium storing instructions that, when executed by at least one processor, cause the at least one processor to perform operations comprising:

a. receiving a request that includes input text, optional context, and a domain profile identifier;

b. retrieving a domain profile associated with the domain profile identifier, the domain profile specifying required anchors, threshold values, and weighting parameters;

c. normalizing the input text to generate normalized text and extracting anchors from the normalized text and the optional context;

d. computing heuristic features and a model assisted structural stability score for the normalized text;

e. aggregating the heuristic features and the model assisted structural stability score according to the weighting parameters to produce a containment stability score and a containment stability label;

f. selecting, based on the containment stability score and any flags defined by the domain profile, a decision action including one of pass, block, or escalate;

g. building a canonical audit object that includes the request, the domain profile identifier, the heuristic features, the containment stability score, the stability label, and the decision action;

h. computing a cryptographic seal over a canonical representation of the canonical audit object, assigning a record identifier to the canonical audit object, and storing the canonical audit object and the cryptographic seal in a write once read many ledger using a conditional write that rejects an attempted overwrite when the record identifier already exists; and i. outputting the decision action for use by a downstream execution system that delays application of the input text until after successful storage of the canonical audit object in the write once read many ledger and that controls application of the input text so that only pass decisions are applied.

17. The non transitory computer readable storage medium of claim 16, wherein the operations further comprise generating a machine readable rationale object that explains contributors to the containment stability score and including the machine readable rationale object in the canonical audit object.

18. The non transitory computer readable storage medium of claim 16, wherein the operations further comprise generating a refactored version of the input text that satisfies at least one requirement specified in the domain profile and storing the refactored version in the canonical audit object.

19. The non transitory computer readable storage medium of claim 16, wherein the operations further comprise calibrating the threshold values in the domain profile based on evaluation of an adversarial corpus of narratives that are labeled as stable or unstable by human experts.

20. The non transitory computer readable storage medium of claim 16, wherein the operations are performed for natural language requests originating from both human operated authoring interfaces and automated agent processes and the canonical audit object further records an actor identity associated with the request.

\* \* \* \* \*